| (12) | United States Patent | (10) Patent No.: | US 7,299,396 B2 |
|---|---|---|---|
| | Haulk et al. | (45) Date of Patent: | Nov. 20, 2007 |

(54) METHODS AND APPARATUS FOR ERROR DETECTION AND CORRECTION OF AN ELECTRONIC SHELF LABEL SYSTEM COMMUNICATION ERROR

(75) Inventors: Kevin Winton Haulk, Griffin, GA (US); Cheryl Kay Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 20 days.

(21) Appl. No.: 11/326,822

(22) Filed: Jan. 6, 2006

(65) Prior Publication Data

US 2006/0156160 A1    Jul. 13, 2006

Related U.S. Application Data

(63) Continuation of application No. 10/044,535, filed on Jan. 11, 2002, now Pat. No. 7,007,219.

(51) Int. Cl.
*H04L 1/18* (2006.01)
(52) U.S. Cl. ..................................... 714/749
(58) Field of Classification Search ............. 714/748, 714/749
See application file for complete search history.

(56) References Cited

U.S. PATENT DOCUMENTS

| 5,537,414 | A | * | 7/1996 | Takiyasu et al. | ............. | 370/347 |
| 5,880,449 | A | * | 3/1999 | Teicher et al. | .............. | 235/383 |
| 5,968,197 | A | * | 10/1999 | Doiron | ........................ | 714/748 |
| 6,425,105 | B1 | * | 7/2002 | Piirainen et al. | ............ | 714/748 |
| 6,829,670 | B1 | * | 12/2004 | Nakamura | ................... | 710/310 |
| 6,938,195 | B1 | * | 8/2005 | Shi et al. | ..................... | 714/748 |
| 6,977,888 | B1 | * | 12/2005 | Frenger et al. | ............. | 370/218 |

* cited by examiner

*Primary Examiner*—James C. Kerveros
(74) *Attorney, Agent, or Firm*—Priest & Goldstein, PLLC

(57) ABSTRACT

In one aspect, the ESL system automatically detects ESL communication errors which result in incorrect data in the ESL's registers, and then automatically takes corrective action to update the ESL's memory with the correct data. In one aspect, the host computer transmits a register update message to an ESL. If a negative acknowledgment message or no response is received, then the host computer resends the register update message, or takes other appropriate corrective action. If the host computer receives a positive acknowledgement message, the host computer then automatically transmits one or more messages to the ESL to verify the contents of the ESL's registers to ensure that a positive acknowledgement was actually transmitted.

15 Claims, 3 Drawing Sheets

METHODS AND APPARATUS FOR ERROR DETECTION AND CORRECTION OF AN ELECTRONIC SHELF LABEL SYSTEM COMMUNICATION ERROR

CROSS-REFERENCE TO RELATED APPLICATIONS

This application is a continuation of U.S. Ser. No. 10/455,535, filed Jan. 11, 2002, now U.S. Pat. No. 7,007,219.

FIELD OF THE INVENTION

The present invention relates generally to improvements in electronic shelf label (ESL) systems used in transaction establishments. More specifically, the present invention relates to improvements in methods and apparatus for detecting and correcting communication errors which result in data errors in an ESL's registers or memory.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including price change messages, to the ESLs.

While prior ESL systems provide many of the capabilities required by retailers, these systems may suffer from various disadvantages. For example, while communication between the central server and the ESLs is quite reliable, occasionally noise or other interference cause the central server to detect a particular response when another response, or no response at all, was transmitted by the ESL. Such an error may cause the central server to believe an ESL is correctly displaying information, when in actuality the ESL is not displaying the correct information. Therefore, it would be desirable to provide an ESL system and method that automatically detects ESL communication errors which result in the ESL containing incorrect data in the ESL's registers, and then automatically takes corrective action to update the ESL's memory with the correct data.

SUMMARY OF THE INVENTION

The present invention advantageously provides methods and apparatus for an improved electronic shelf label (ESL) system. The present invention provides an ESL system and method that automatically detects ESL communication errors which may result in the ESL containing incorrect data in the ESL's registers, and then automatically takes corrective action to update the ESL's memory with the correct data. In one aspect, a host computer transmits a register update message to an ESL. If a negative acknowledgement message or no response is received, then the host computer may resend the register update message, or take other such action. If the host computer receives a positive acknowledgment message, or what appears to be a positive acknowledgement message, the host computer then automatically transmits one or more messages to the ESL to verify the contents of the ESL's registers to ensure that a positive acknowledgement was actually transmitted.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021 filed Jan. 11, 2002 entitled "Methods and Apparatus for Performing Delta Updates of an Electronic Shelf Label", U.S. patent application Ser. No. 10/044,610 filed Jan. 11, 2002 entitled "Methods and Apparatus for Intelligent Data Bedcheck of an Electronic Shelf Label", U.S. patent application Ser. No. 10/044,020 filed Jan. 11, 2002 entitled "Methods and Apparatus for Reduced Electronic Shelf Label Power Consumption", U.S. patent application Ser. No. 10/044,439 filed Jan. 11, 2002 entitled "Methods and Apparatus for Automatically Locating an Electronic Shelf Label", U.S. patent application Ser. No. 10/044,440 filed Jan. 11, 2002 entitled "Methods and Apparatus for Conserving Battery Power in an Electronic Shelf Label System", U.S. patent application Ser. No. 10/044,688 filed Jan. 11, 2002 entitled "Methods and Apparatus for Automatic Assignment of a Communication Base Station and Timeslot for an Electronic Shelf Label", U.S. patent application Ser. No. 10/044,535 filed Jan. 11, 2002 entitled "Methods and Apparatus for Error Detection and Correction in an Electronic Shelf Label System", all of which are assigned to the assignee of the present invention and incorporated by reference herein in their entirety.

Figure 1:
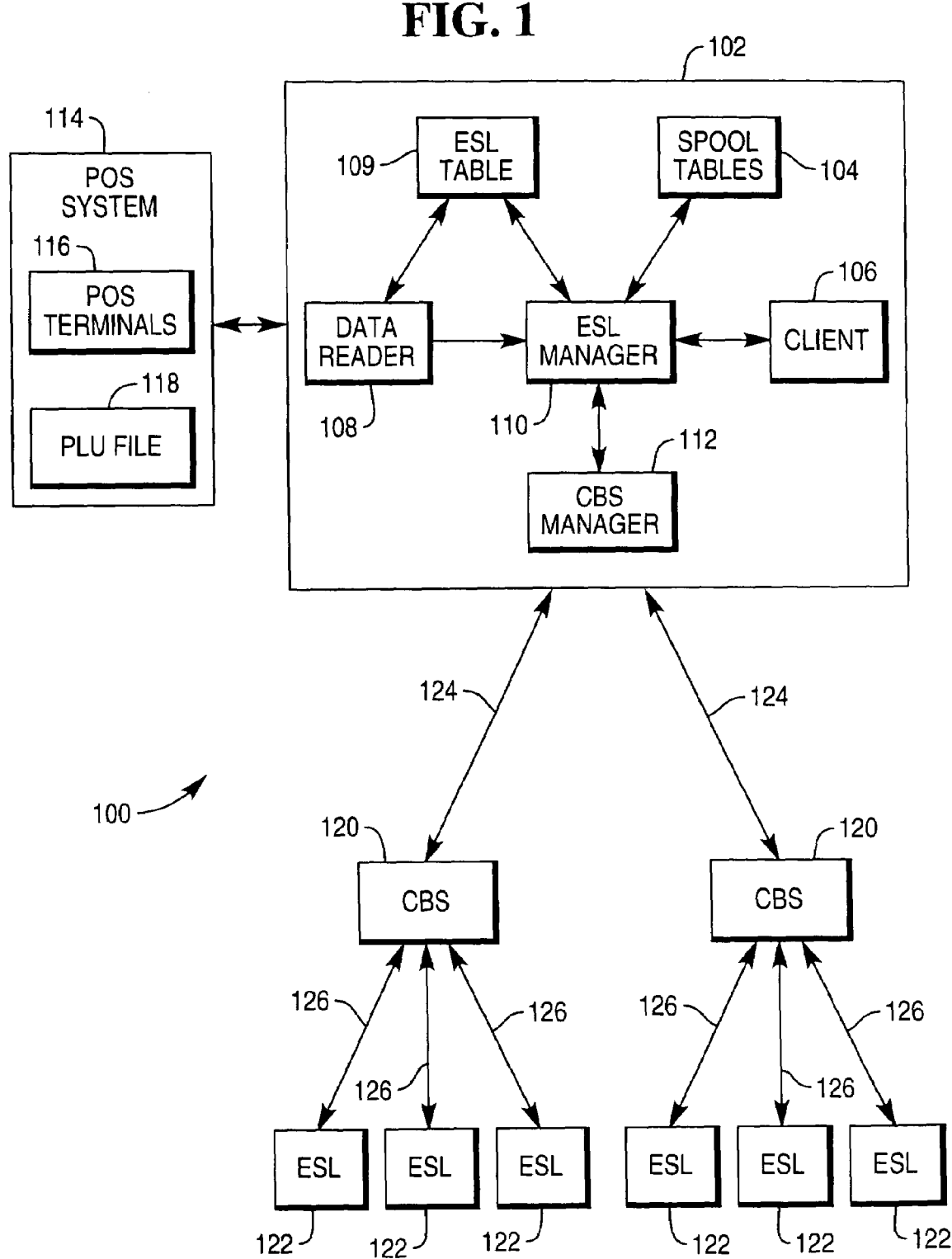
FIG. 1 shows a block diagram of a transaction management system in accordance with the present invention.

FIG. 1 shows a transaction management system 100 in accordance with the present invention. The system 100 includes an ESL computer system 102 and a point-of-service (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client application 106 and a communication base station (CBS) manager 112. POS system 114 includes a price look-up (PLU) file 118 and POS terminals 116.

The system 100 also includes CBSs 120 and ESLs 122. The CBSs 120 may be suitably mounted in or near the ceiling of the retail establishment. ESLs 122 are typically attached to store shelving adjacent to items.

The ESL manager 110 records and schedules messages to the ESLs 122. The ESL manager 110 monitors and maintains an action list for the ESLs 122 utilizing spool tables 104, and provides a scheduling function for time related events which need to occur at a future point at time. Items on the action list may be provided from client components as requests for work, may be automatically generated by the ESL manager 110, or could be due to requests that required additional processing at a later date, such as, for example, a series of sale prices to be represented at the tags at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS manager 120, the ESL manager 112 then updates the ESL table 109 and spool tables 104 as appropriate. Such updates may include marking a particular task as completed, updating the data image of the ESL 122, and the like. A client application, such as client application 106, may interface with the ESL manager 110. The data reader 108 provides an interface from the ESL manager 110 to the POS system 114.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes the response of a particular ESL 122 after a CBS 120 has received that response and then passed that response to the CBS manager 112. Additionally, the CBS manager 112 monitors the CBSs 120 for problems, performs diagnostics on the CBSs 120 and logs errors.

The messages are sent to the CBSs 120 through communication link 124. Communication link 124 may suitably utilize radio frequency (RF) communication, infrared (IR) communication, a wired link, or some combination of communication techniques. After receiving a message from the host system 102, the CBSs 120 then transmit the message to the ESLs 122 utilizing communication link 126, which may suitably utilize RF communication, IR communication, a wired link or some combination of communication techniques. In an alternate embodiment, host system 102 may communicate directly with ESLs 122.

After receiving a message, the ESLs 122 transmit a response to CBSs 120 over communication link 126. The CBSs 120 would then process and retransmit the response message to the CBS manager 112 over communication link 124.

The ESL data file 109 consists of multiple records, with each record corresponding to a particular ESL 122 in a retail establishment. The record for each ESL 122 includes a number of fields, with each field containing the data which is supposed or assumed to be in one of the registers of the ESL 122. Thus, the record contains a picture, or full data image, of what data is intended to be stored in the ESL 122, and consequently, what the ESL 122 should be displaying on the ESL's display. Additionally, each record may include a variety of additional non-display information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

Figure 2:
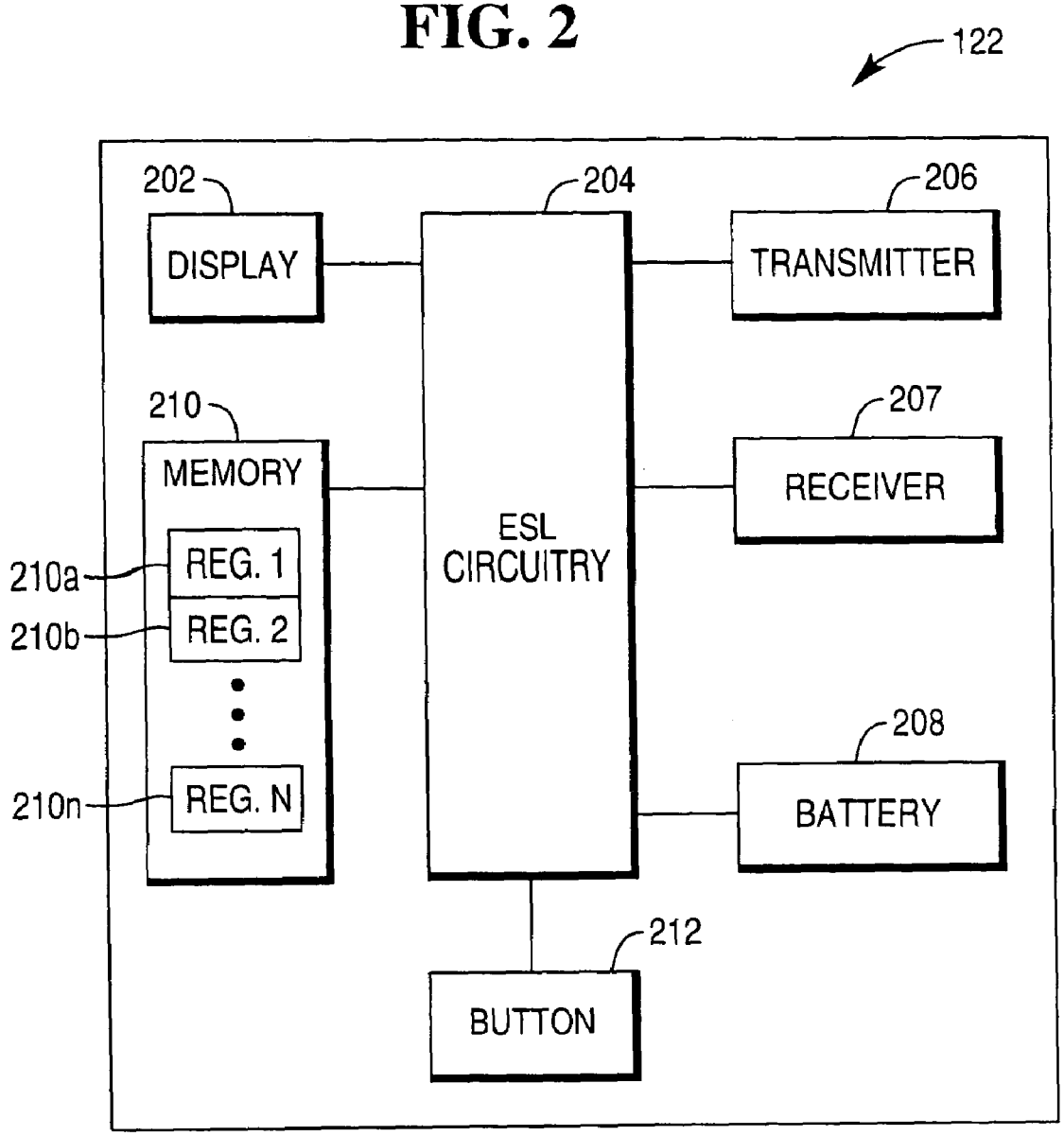
FIG. 2 is a block diagram of an ESL in accordance with the present invention.

FIG. 2 shows a block diagram of an exemplary ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication, IR communication, a wired link or some combination of communication techniques. A battery 208 provides power for the operation of ESL 122. The operation of ESL 122 is controlled by ESL circuitry 204. ESL circuitry 204 decodes incoming messages received, and performs any actions indicated by the messages. For example, if a price change message is received, the ESL circuitry 204 would cause the display 202 to be updated with the new price information. ESL memory 210 includes a plurality of registers, such as registers 210a, 210b, . . . , 210c. The ESL memory 210 may contain many types of information. For example, the memory 210 may include display registers which contain the actual text to be displayed by the ESL 122. This text may include item price, informative or promotional text, text directed to store employees, and the like. Other registers may contain data which controls various parameters related to the display of the text, such as display register selection and timing sequences, for example. The ESL 122 may also include a button 212 which may be depressed to initiate a particular function, such as, for example, the display of an alternate message.

When the host computer 102 sends a message, such as a register update message, to an ESL 122, the ESL 122 responds with a positive acknowledgement (ACK) message if the register update message was successfully received. While communication between the host computer 102, or CBSs 120, and the ESLs is quite reliable, occasionally noise or other interference may cause the host computer 102 to detect an ACK message when a negative acknowledgement (NACK) message, or no response at all, was transmitted by the ESL 122. Such an error, or false positive, may cause the host computer 102 to believe an ESL is correctly displaying information, when in actuality the ESL 122 is not displaying the correct information due to the register update message not being correctly received by the ESL 122.

The present invention provides an ESL system and method that automatically detects ESL communication errors which result in the ESL containing incorrect data in the ESL's registers, and then automatically takes corrective action to update the ESL's memory with the correct data. In one aspect, the host computer 102 transmits a register update message to an ESL 122. If a NACK message or no response is received, then the host computer may resend the register update message, log an error message to a human operator, or take other such action in accordance with the retail establishment's operating procedure. If the host computer 102 receives an ACK message, or what appears to be an ACK message, the host computer 102 then automatically transmits one or more messages to the ESL 122 to verify the contents of the ESL's registers.

In a preferred embodiment, one or more bedcheck messages may be transmitted by the host computer 102 to the ESL 122 which verifies that the data contained in the ESLs registers matches the data for that ESL contained in a host computer file, such as the ESL data file 109. Each data bedcheck message contains a sumcheck or error checking code, such as a cyclical redundancy check (CRC), of register data in the ESL data file 109. In other words, the sumcheck is a number calculated using the register data in the host computer file which corresponds to the data which should be stored in the registers of ESL 122. The data bedcheck message requests that the ESL compare the received sumcheck with a sumcheck calculated using the data actually contained in the ESL. If the received sumcheck matches the calculated sumcheck, the ESL 122 responds to the data bedcheck message with an ACK. If the received sumcheck does not match the calculated sumcheck, the ESL 122 responds to the data bedcheck message with a NACK.

If a NACK message or no response is received in response to the bedcheck message, then the host computer 102 assumes that the first ACK was an error or a "false positive." The host computer 102 may then retransmit the register update message, log an error message to a human operator, or take other such action in accordance with the retail establishment's operating procedure. If a NACK message or no response is received in response to the retransmitted message, the host computer may then provide an error indication to a human operator indicating an ESL communication problem.

If an ACK message is received in response to the bedcheck message, then the host computer 102 assumes that the first ACK was a valid acknowledgment and no further action is taken.

In a typical retail environment, the host computer 102 transmits messages to and receives responses from a plurality of ESLs 122. The host computer may log the number of "false positives" received from each of the plurality of ESLs 122 over a period of time in order to provide a statistical record of which ESLs 122 may be more prone to communication failure. For example, if a store averages one "false positive" per ESL 122 per month and communication with a particular ESL 122 in that store results in 15 false positives per month, the host computer may provide an error indication to the system operator. The system operator may then take action to determine the source of the communication problem.

Figure 3:
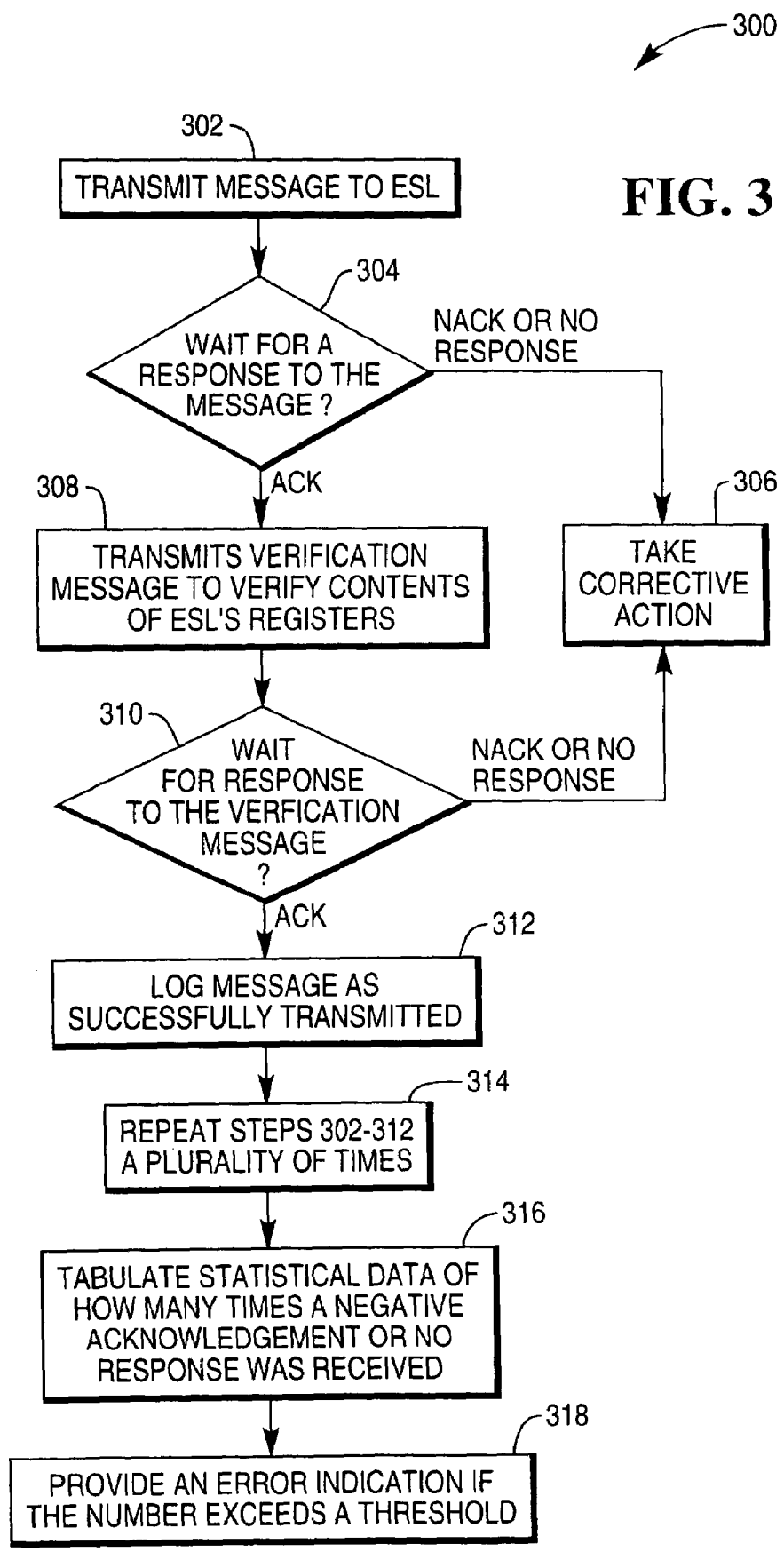
FIG. 3 shows a method of detecting and correcting communication errors in accordance with the present invention.

FIG. 3 shows a method 300 of automatically detecting and correcting communication errors in an ESL system in accordance with the present invention. In step 302, a computer system, such as host computer system 102, transmits a message, such as a register update message, to an ESL. In step 304, the host computer waits for a response to be transmitted from the ESL. If a NACK message or no response is received by the host computer system, then the method continues to step 306. In step 306, the host computer takes some form of corrective action, such as resending the register update message, logging an error message to a human operator, or other such action in accordance with the retail establishment's operating procedure. If an ACK message, or what appears to be an ACK message, is received by the host computer system in step 304, the method continues to step 308. In step 308, the host computer automatically transmits one or more messages to the ESL to verify the contents of the ESL's registers. In a preferred embodiment, a bedcheck message may be transmitted to the ESL to verify that the contents of the ESL's registers match the data for that ESL contained in the host computer system. In step 310, the host computer waits for a response. If a NACK message or no response is received by the host computer system, then the method continues to step 306. If an ACK message is received by the host computer system in step 310, the method continues to step 312. In step 312, the host computer logs the original message as successfully sent.

At optional sten 314, steps 302 through 312 are repeated a plurality of times. At optional step 316, statistical data is tabulated of the number of times a negative acknowledgement or no response was received. At optional step 318, if the number exceeds a threshold, an error indication is provided.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, while a presently preferred embodiment utilizes an ESL to display informational text or price of an associated item, an ESL system may utilize ESLs in a variety of applications and environments without departing from the spirit and scope of the present invention.

We claim:

1. A method of automatically validating the contents of an electronic shelf label's (ESL's) registers in order to detect and correct communication errors, the method comprising the steps of:
   wirelessly transmitting a verification message to verify that the contents of the electronic shelf label's registers match an expected content after transmission of an initial message and receipt of a response interpreted as a positive acknowledgement;
   wirelessly receiving a response to the verification message verifying the contents of the registers match the expected content; and
   logging an indication that the initial message was successfully received in response to the received response.

2. The method of claim 1 wherein the expected contents are maintained by a host computer communicating with an electronic shelf label.

3. The method of claim 1 further comprising the step of:
   retransmitting the initial message in response to the received response indicating that the contents of the ESL's registers do not match the expected contents.

4. The method of claim 3 further comprising the step of:
   providing an indication of a communication problem in response to a negative acknowledgement or receiving no response to the retransmitted initial message.

5. The method of claim 1 wherein the initial message is a command to update at least one of the ESL's registers.

6. The method of claim 1 wherein the verification message is a data bedcheck message.

7. The method of claim 1 wherein the step of transmitting a verification message immediately follows the receipt of a positive acknowledgement acknowledging the transmitted initial message.

8. An electronic shelf label (ESL) system comprising:
   an ESL for displaying information relating to an item associated with the ESL, the ESL including a plurality of registers for storing data, the data including information to be displayed by the ESL and parameters used by the ESL to control presentation and formatting of the information displayed; and
   a host computer system wirelessly transmitting a verification message to verify the contents of the ESL's registers in response to a transmitted initial message and receipt of a response interpreted as a positive acknowledgement of the initial message, the host computer wirelessly receiving a response to the verification message, the host computer determining whether the response to the verification message indicates that the contents of the ESL's registers match the expected contents as maintained by the host computer.

9. The system of claim 8 wherein the received response to the verification message is a positive acknowledgement, the host computer logging the transmitted initial message as successfully received.

10. The system of claim 8 wherein the transmitted initial message is a command to update at least one of the ESL's registers.

11. The system of claim 8 wherein the verification message is a data bedcheck message.

12. A method of determining when there is a communication failure with an electronic shelf label (ESL), the ESL having registers storing data maintained by a host system, the method comprising:

wirelessly transmitting a verification message to verify that the contents of an electronic shelf label's registers match an expected content after transmission of an initial message and receipt of a response interpreted as a positive acknowledgement;

waiting for an acknowledgement of the verification message; and wirelessly transmitting a register update message to the ESL to update its registers in response to a negative acknowledgement or after a timer expires and no response has been received by the host computer.

13. The method of claim 12 further comprising the step of:

logging the transmitted initial message as successfully received in response to the acknowledgement indicating that the contents of the ESL's registers match the expected contents as maintained by the host computer.

14. The method of claim 12 further comprising the step of:

tabulating statistical data of the number of times negative acknowledgements were received or no response was received.

15. The method of claim 14 further comprising the step of:

providing an error indication if the number exceeds a threshold.

\* \* \* \* \*